Aug. 18, 1925.
T. H. MASSEY
1,550,380
MACHINE FOR CUTTING PILE FABRICS
Filed Aug. 29, 1924    2 Sheets-Sheet 1
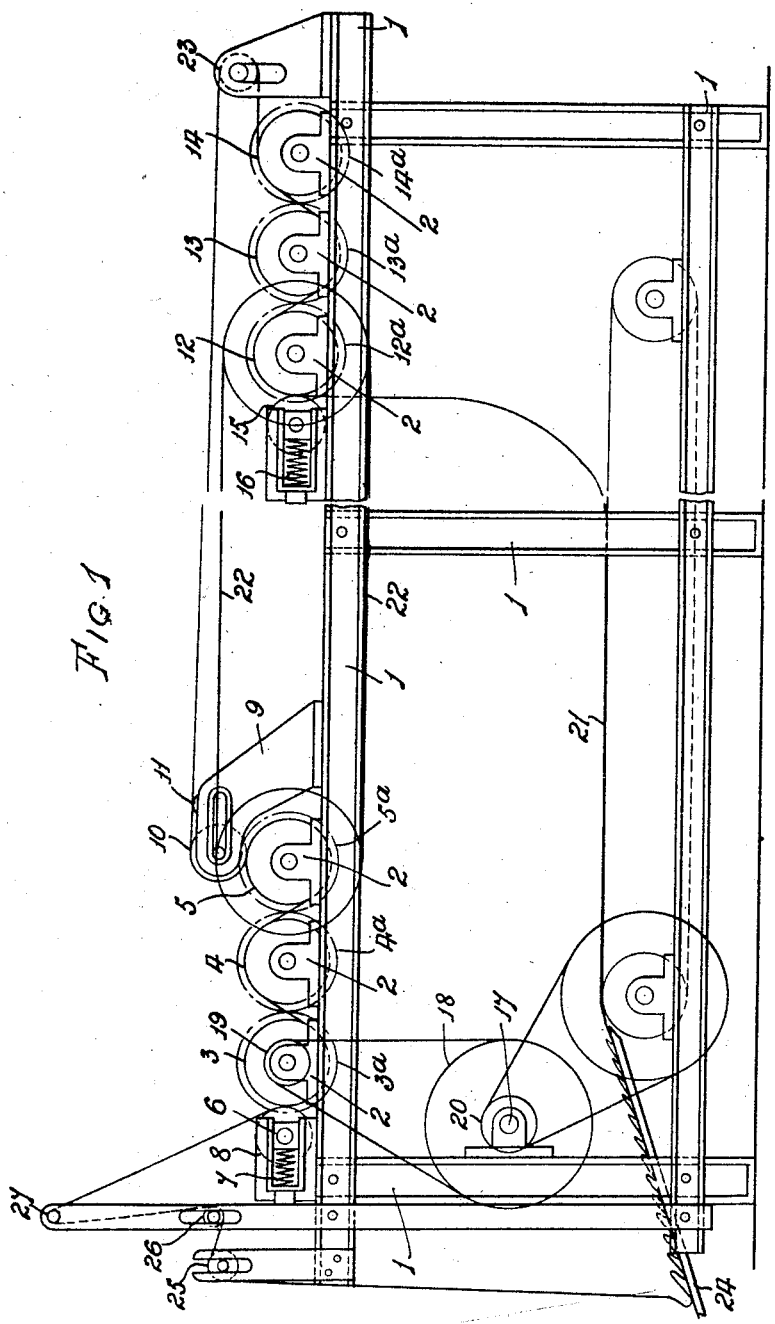
INVENTOR
THOMAS HENRY MASSEY
BY Francis C. Boyce
ATTORNEY Aug. 18, 1925. 1,550,380
T. H. MASSEY
MACHINE FOR CUTTING PILE FABRICS
Filed Aug. 29, 1924  2 Sheets-Sheet 2
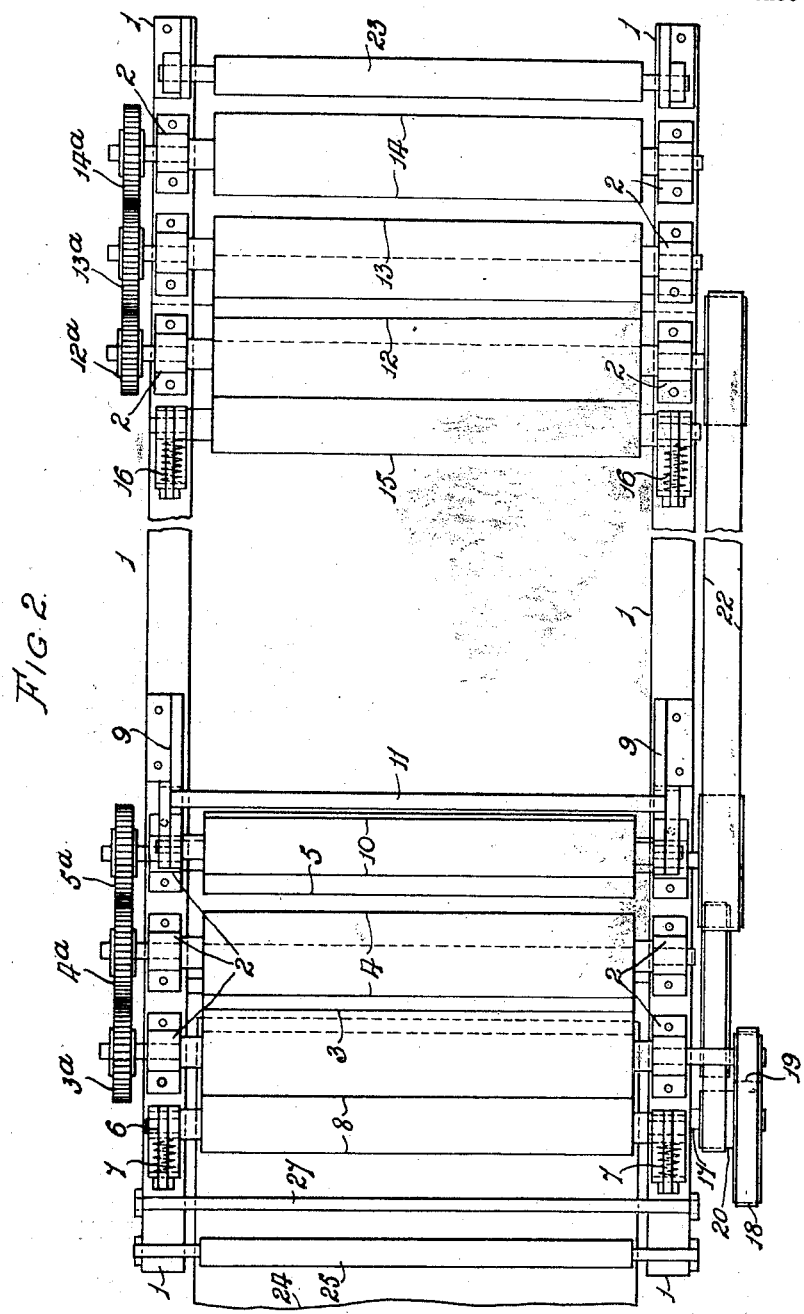
INVENTOR
THOMAS HENRY MASSEY
BY Francis E. Bayco
ATTORNEY Patented Aug. 18, 1925.

1,550,380

UNITED STATES PATENT OFFICE.

THOMAS HENRY MASSEY, OF CONGLETON, ENGLAND.

MACHINE FOR CUTTING PILE FABRICS.

Application filed August 29, 1924. Serial No. 734,867.

*To all whom it may concern:*

Be it known that I, THOMAS HENRY MASSEY, a subject of the King of Great Britain, residing at Yew Tree Cottage, Congleton, in the county of Chester, England, have invented new and useful Improvements in Machines for Cutting Pile Fabrics, of which the following is a specification.

The invention relates to improvements in or relating to machines for cutting pile fabrics and has for its object to provide improved means for maintaining the tension of the cloth as it passes through the machine whilst entailing a minimum amount of power.

For the purpose of my invention I employ one or more or a series of gripping rollers in the machine the roller or rollers being suitably geared together in order that their surface speed may be identical with each other.

At a suitable distance from the last gripping roller I employ another series of gripping rollers the space between these two series of gripping rollers being employed for the purpose of cutting the fabric.

After the first series of gripping rollers I employ a tension roller provided with a spring or springs, weights, or the like and in front of the second series a similar tension roller is employed so that any suitable tension may be put on the fabric to be operated upon.

The two series of gripping rollers are geared together so that the second series of gripping rollers shall revolve at a suitably increased surface speed to the first series in order that the fabric may be held in suitable tension for the cutting operation.

In the operation of cutting the fabric it is fed into the first series of tension and gripping rollers to the space for cutting and thence to the second series of gripping and tension rollers the ends of the fabric being joined together and the fabric may then be cut by the operative, in any desired manner for the full length and/or width of the material.

By the means hereinbefore described the fabric is kept at a uniform tension in the machine with the resultant effect that less power is required to drive the machine than has hitherto been obtainable.

And in order that my said invention may be more clearly understood and readily carried into effect I will now proceed aided by the accompanying drawings more fully to describe the same.

*Description of the drawings.*

Figure 1 is a side elevation of a machine for cutting pile fabric having the present invention applied thereto, and Figure 2 is a plan thereof.

Referring to the drawings, 1 represents the frame of the machine upon which is mounted at one end thereof in bearings 2 a series of gripping rollers 3, 4 and 5 which are geared together by means of gear wheels or pinions $3^a$, $4^a$ and $5^a$, respectively, in such manner that when rotated the surface speed of each roller will be identical.

Mounted in slidable bearings 6 and constrained by means of springs 7 to press tightly upon the roller 3 is the tension or nip roller 8 and mounted in the bracket 9 adjacent to the roller 5 are a roller 10 and a guide bar 11 over which the fabric under treatment is passed.

At the other end of the frame 1 is mounted in bearings 2 a similar series of gripping rollers 12, 13 and 14, being geared together by means of gear wheels $12^a$, $13^a$ and $14^a$, the roller 12 being provided with a tension or nip roller 15 similar in action to the tension or nip roller 8 being constrained to press tightly on said roller 12 by the springs 16.

Mounted upon the frame 1 of the machine is a counter-shaft 17 which receives motion from any suitable source of power through a suitable driving pulley (not shown) mounted thereon and a pulley 18 upon said shaft 17 is connected to a pulley 19 upon the shaft of the roller 3 which thus receives its driving motion while another pulley 20 upon said shaft 17 is adapted to drive an endless conveyor 21 situated beneath the machine.

The rollers 5 and 12 are geared together by means of a belt 22 in such manner that the second series of rollers 12, 13 and 14 receives a slightly higher surface speed than the first series of rollers 3, 4 and 5 although any means other than the belt 22 may be employed for gearing the series of rollers together, if desired, such as a train of gear wheels or the like.

In operation, the fabric is fed between the tension rollers 8 and 3, passed over the roller 4, under the roller 5, and over the roller 10 and the guide bar 11 from which it passes via a guide roller 23, which is adjustable in height, over the roller 14, under the roller 13 and over the roller 12 where it passes between said roller 12 and the tension roller 15.

From here the fabric passes beneath the machine upon an endless conveyor 21 which carries it to the front of the machine and deposits it upon a sloping board 24 from whence it is drawn over suitable guide rollers 25, 26 and 27 and the two ends of the fabric are joined in such manner as to form an endless band which is driven through the machine by the gripping action of the rollers thereupon.

By reason of the action of the tension or nip rollers 8 and 15 and the fact of the rollers 12, 13 and 14 having a slightly higher surface speed than the rollers 2, 3 and 4 the fabric is maintained at a uniform tension as it passes the knife of the operative which is situated between the guide bar 11 and the guide roller 23.

If desired the bracket 9, roller 10 and bar 11 might be dispensed with, the fabric led from the roller 5 directly over the guide bar 11, and it will be understood that the number of gripping rollers in each series may be varied and the details of construction of the device further modified without departing from the principle of the invention.

What I claim as my invention and desire to secure by Letters Patent is—

1. In a machine of the class described, the combination of two groups of tensioning rollers, the individual rollers of each group being of equal diameter and geared together in spaced relation to each other, a pressure roller in contact with one roller of each group, and means for driving the rollers of one group at a speed different from that of the other group.

2. In a machine for cutting pile fabrics, the combination of a frame, a series of gripping rollers geared together at one end of said frame, a second series of gripping rollers geared together at the other end of the frame, the individual rollers of each series being of equal diameter and spaced apart from each other, a spring controlled tension roller in engagement with one roller of each series, a guide roller for guiding the material through the machine, and gearing connecting the two series of rollers in such manner that the second series has a slightly higher surface speed than the first series, whereby that part of the material between the two series of rollers is maintained at a uniform tension.

In testimony whereof I have signed my name to this specification.

THOMAS HENRY MASSEY.